United States Patent [19]
Shiobara et al.

[11] Patent Number: 6,105,864
[45] Date of Patent: Aug. 22, 2000

[54] TERMINAL DEVICE AND TERMINAL SYSTEM

[75] Inventors: Tomomi Shiobara; Shigeru Hashimoto; Koken Yamamoto; Nobuhiko Akasaka; Akiko Iwami, all of Kawasaki, Japan

[73] Assignee: Fujitsu Limited, Kawasaki, Japan

[21] Appl. No.: 08/972,242

[22] Filed: Nov. 18, 1997

[30] Foreign Application Priority Data

May 9, 1997 [JP] Japan ..................................... 9-119458

[51] Int. Cl.⁷ ..................................................... G06F 17/60
[52] U.S. Cl. ........................... 235/379; 235/383; 705/17; 705/21
[58] Field of Search .................................... 235/379, 383; 902/22; 705/17, 18, 21, 39, 41

[56] References Cited

U.S. PATENT DOCUMENTS 5,799,087 8/1998 Rosen ....................................... 235/379

*Primary Examiner*—F. L. Evans
*Attorney, Agent, or Firm*—Arent Fox Kintner Plotkin & Kahn, PLLC

[57] ABSTRACT

A terminal device and a terminal system which are adapted for electronic money, excellent in operability and easy in the management of the electronic money. The terminal device used in combination with a host server has a function receiving a predetermined amount of electronic money from the host server when running start is instructed, a function of receiving the electronic money of the amount of payment from an IC card of a customer when a goods is bought, a function of transferring the electronic money to the host server so that when the internal balance of the electronic money exceeds an upper limit value of the balance, the balance of electronic money reaches a lower limit value of the balance, a function of transferring all the internal amount of electronic money to the host server, and other functions.

22 Claims, 9 Drawing Sheets

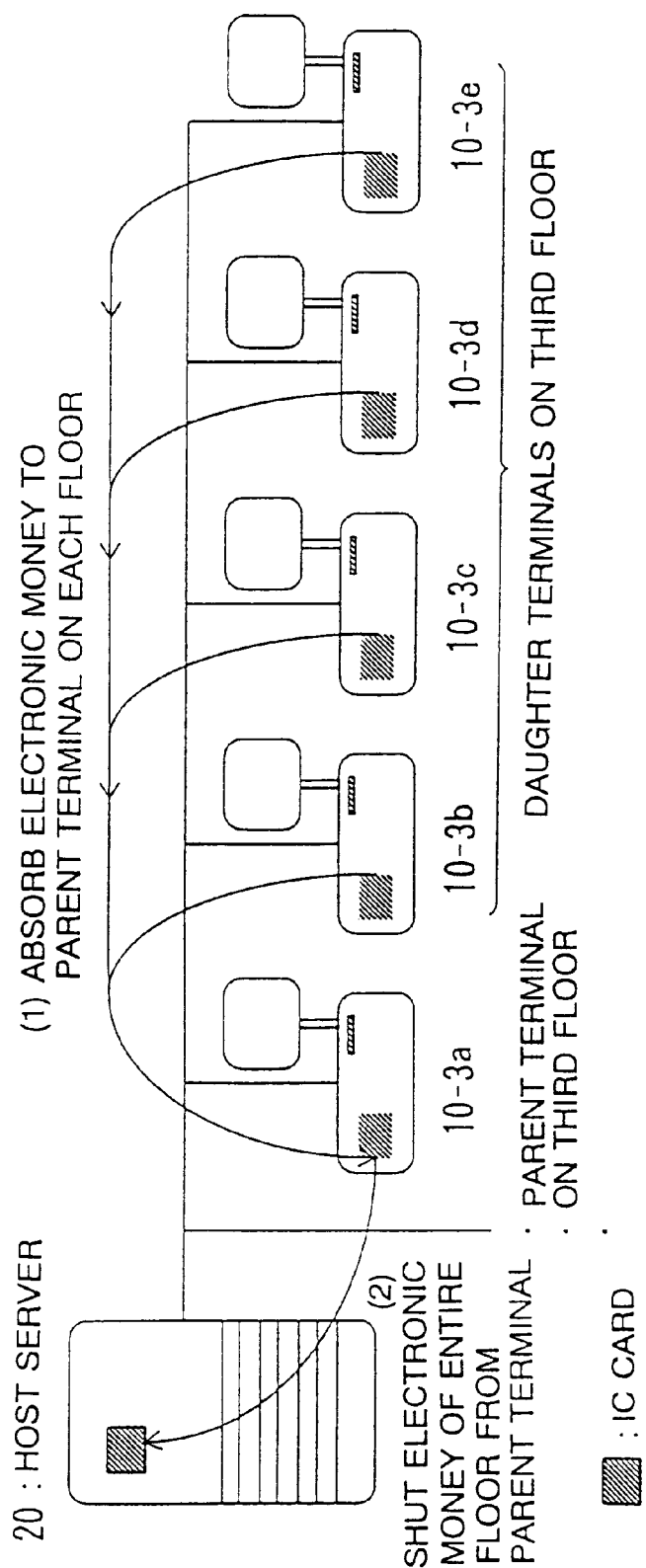

TERMINAL DEVICE AND TERMINAL SYSTEM

BACKGROUND OF THE INVENTION

1. Field of the Invention

The present invention relates to a terminal device and a terminal system for making transaction through electronic money, and more particularly to a terminal device and a terminal system which are employed for sale of articles, for example, at a store such as a super market or a department store.

2. Description of the Related Art

At present, where electronic money stored in an IC card or the like can be employed is limited to a location (device) which is specified by a publisher of the electronic money, and an object of a POS system used in a store such as a super market or a department store is money or a credit card.

SUMMARY OF THE INVENTION

The present invention has been made to solve the above problem, and therefore an object of the present invention is to provide a terminal device and a terminal system which deals with electronic money and is excellent in operability and easy in the management of the electronic money.

In order to solve the above problem, according to a first aspect of the present invention, there is provided a terminal device which is connected to a host device that functions as a money safe of electronic money in use, and is comprised of: an electronic money storage section for storing electronic money; a first moving section for moving the electronic money corresponding to an amount transferred by transaction with a customer from an electronic money storage medium of the customer to the electronic money storage section; and a first balance adjusting section for moving the electronic money as much as an amount by which the electronic money exceeds a lower limit value which is a value lower than a predetermined upper limit value within the electronic money storage section to the host device when the valance of the electronic money within the electronic money storage section exceeds the predetermined upper limit value.

In other words, the terminal device according to the first aspect of the present invention has a function of transferring the electronic money of the amount by which the electronic money exceeds the lower limit value which is lower than the upper limit value to the host device when the balance of the electronic money exceeds the upper limit value. For that reason, since the internal electronic money balance is adjusted so as not to exceed the upper limit value, damage can be suppressed at the minimum even if a theft, a failure or the like occurs. Also, since a difference between the upper limit value and the lower limit value is determined on the basis of a mean unit cost of goods (an article, service, etc.) so that the frequency at which the electronic money is transferred to the host device can be adjusted, the operation rate of the terminal device can be prevented from becoming low due to the transfer of the electronic money.

According to a second aspect of the present invention, there is provided a terminal device which is connected to a host device that functions as a money safe of electronic money in use, and is comprised of: an electronic money storage section for storing electronic money; a first moving section for moving the electronic money corresponding to an amount which is transferred by transaction with a customer from an electronic money storage medium of the customer to the electronic money storage section; and a second moving section for moving all the electronic money within the electronic money storage section to the host device when a predetermined time comes.

In other words, the terminal device according to the second aspect of the present invention has a function of transferring all the electronic money as held to the host device when a predetermined time comes (a time at which a shutting process should be conducted is set in advance). Using the terminal device thus organized, the management of the electronic money can be readily conducted if countermeasure is conducted on the theft or the like to the electronic money within the host device after the predetermined time comes.

The terminal device according to the second aspect of the present invention is further comprised of a first balance adjusting section for moving the electronic money of the amount by which the electronic money exceeds a predetermined lower limit value within the electronic money storage section to the host device when the balance of the electronic money within the electronic money storage section exceeds the predetermined lower limit value. With the terminal device thus organized, the terminal device additionally with the advantage obtained by the terminal device of the first aspect of the present invention can be obtained.

Also, the terminal device according to the first or second aspect of the present invention may further be comprised of: a third moving section for moving the electronic money corresponding to an amount which is transferred by transaction with a customer from the electronic money storage section to the electronic money storage medium of the customer; and a second balance adjusting section for moving the electronic money from the host device to the electronic money storage section so that the balance of the electronic money within the electronic money storage section reaches the lower limit value when the balance of the electronic money within the electronic money storage section is lower than the lower limit value. In other words, the terminal device may be structured such that a refund can be made.

Also, the terminal device according to the first or second aspect of the present invention may further be comprised of a fourth moving section for moving all the electronic money within the electronic money storage section to the host device when a predetermined instruction is inputted to the terminal device. With the terminal device thus organized, since the terminal device can readily be made in a state in which the electronic money is not held when an operator is away from a seat, the terminal device used safely can be obtained.

The terminal device according to the first aspect of the present invention is made up of the combination of the host device that functions as a money safe of the electronic money and a plurality of terminal devices. The combination of the host device and the plurality of terminal devices has such a tree structure that the host device is a root, and the respective terminal devices are nodes other than the root. As the terminal device, there is used a device which includes: an electronic money storage section for storing the electronic money; a first moving section for moving the electronic money corresponding to an amount which is transferred by transaction with a customer from the electronic money storage medium of the customer to the electronic money storage section; and a second moving section for moving, after confirming that the balance of the electronic money storage section in all the terminal devices which are daughters of a subject terminal device is zero at the time of conducting a shutting process, all the electronic money within the electronic money storage section to the terminal device which is a parent of the subject terminal device or the host device.

In the terminal system thus organized, the electronic money within the hypostatic terminal devices is sequentially collected in the epistatic terminal devices, and through the terminal device with the host device as its parent device, all the electronic money within the offspring terminal devices is transferred to the host device. With this structure, this terminal system can be used without processing being concentrated into the host device during the shutting process.

The terminal device according to the second aspect of the present invention is made up of the combination of the host device that functions as a money safe of the electronic money and a plurality of terminal devices. The combination of the host device and the plurality of terminal devices has such a tree structure that the host device is a root, and the respective terminal devices are nodes other than the root. As the host device, there is used a device which includes a transfer section for transferring to a subject terminal device the total amount of the electronic money to be held in a state where the subject terminal device and the offspring terminal devices of the subject terminal device are in an initial state, when receiving a reset request from the terminal device which is a daughter of the subject terminal. Also, as the terminal device, there is used a device which includes: an electronic money storage section for storing the electronic money; an exchange section for exchanging the electronic money corresponding to the amount which is transferred by transaction with the customer between the electronic money storage medium of the customer and the electronic money storage section; a reset request sending section for sending the reset request to the terminal device which is a parent of the subject terminal device or the host device when the subject terminal device is started; an electronic money receiving section for storing the electronic money which has been transferred from the terminal device which is a parent of the subject terminal device or the host device in the electronic money storage section in response to the reset request from the reset request sending section; and an inter-terminal electronic money transfer section for transferring to the subject terminal device the total amount of the electronic money to be held in the state where the subject terminal device and the offspring terminal devices of the subject terminal device are in the initial state, when receiving the reset request from the terminal device which is a daughter of the subject terminal device.

The terminal system according to the second aspect of the present invention may further include a second moving section for moving to the parent terminal device or the host device all the electronic money within the electronic money storage section after confirming that the balance of the respective electronic money storage sections in all the terminal devices which are daughters of the subject terminal device is zero at the time of conducting an operation which means an execution of a shutting process.

BRIEF DESCRIPTION OF THE DRAWINGS

These and other objects, features and advantages of the present invention will become more fully apparent from the following detailed description taken with the accompanying drawings in which:

FIG. 8 is an explanatory diagram showing the procedure of operation of the shutting process of the respective devices that constitute the terminal system according to the embodiment of the present invention.

DETAILED DESCRIPTION OF THE PREFERRED EMBODIMENTS

Now, a description will be given in more detail of preferred embodiments of the present invention with reference to the accompanying drawings.

Figure 1:
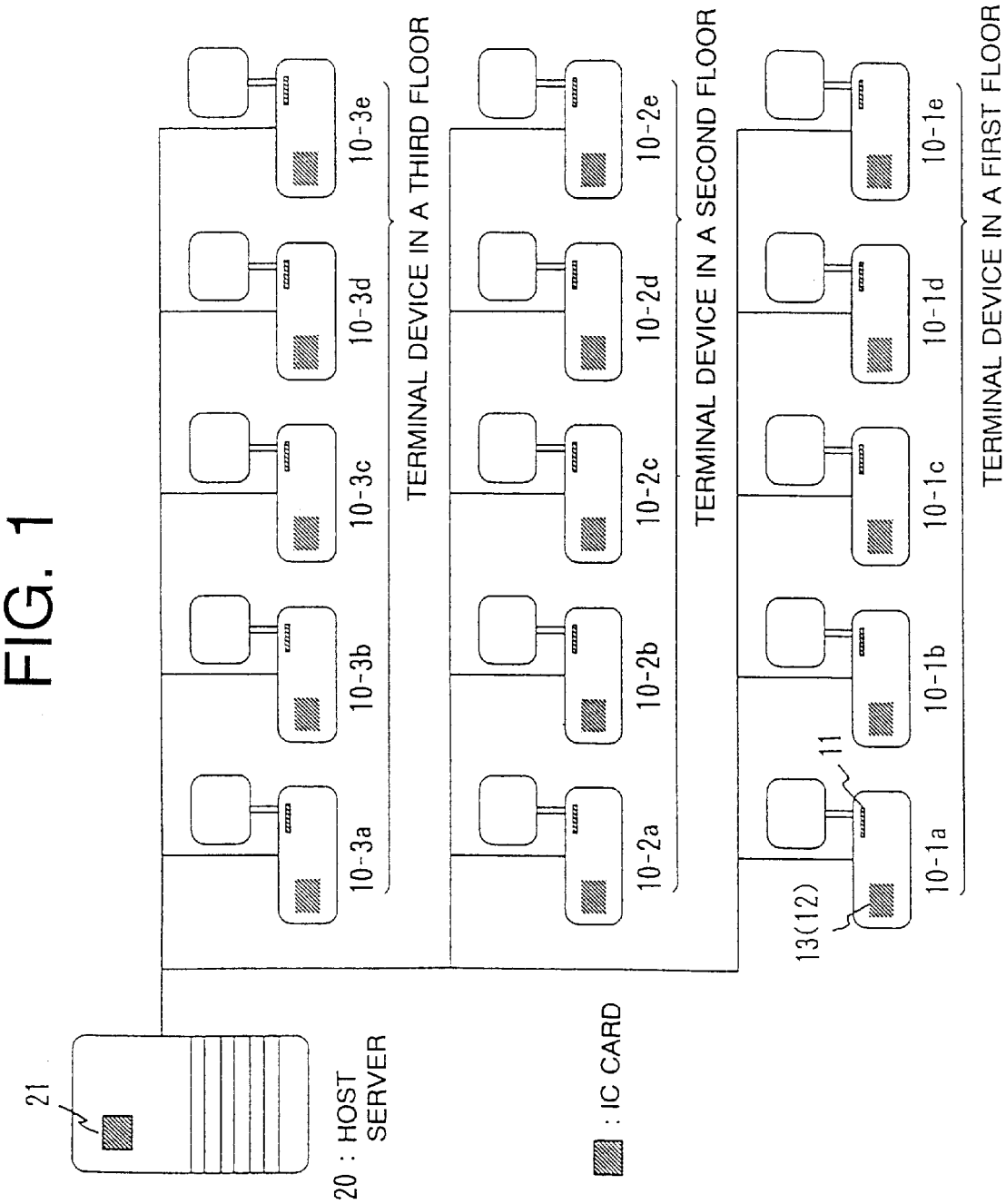
FIG. 1 is an explanatory diagram showing the structure of a terminal system according to an embodiment of the present invention.
Figure 2:
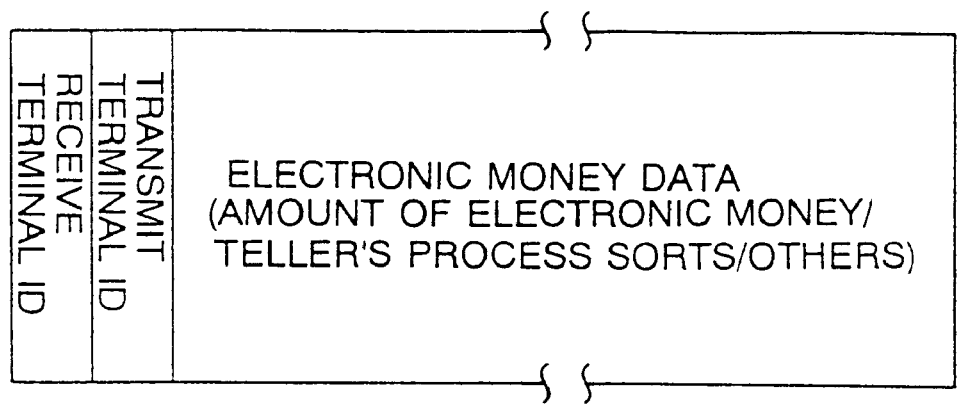
FIG. 2 is an explanatory diagram showing data used in transferring electronic money between devices that constitute the terminal system according to the embodiment of the present invention.

FIGS. 1 and 2 show the structure of a terminal system according to an embodiment of the present invention, and an appearance of a terminal device used in the terminal system, respectively. The terminal system according to this embodiment is a so-called POS (point of sales) system which is used in a super market, a department store and so on, and is designed in such a manner that a plurality of terminal devices 10 and a host server 20 are connected to each other through a communication line, as shown in FIG. 1.

Each of the terminal devices 10 is designed such that it has two IC card readers/writers 11 and 12 are added to a magnetic card reader, a bar cord reader, a liquid-crystal display, and a POS terminal consisting of a control circuit, etc., which mainly includes a CPU, for controlling the magnetic card reader, a bar cord reader and a liquid-crystal display. The IC card reader/writer 11 is attached to a casing of the terminal device 10 in a state where an IC card is readily detachably attached to the IC card reader/writer 11. The IC card reader/writer 11 is used for delivering electronic money between the IC card reader and writer 11 and the customer's IC card. The IC card reader/writer 12 is disposed within the terminal device 10, to which an IC card 13 (hereinafter referred to as "build-in IC card") for temporarily storing the electronic money is set.

The host server 20 is a device that plays the role of a money safe of the terminal system according to this embodiment, which is provided with an IC card 21 for storing the electronic money, likewise.

In constituting the terminal system according to this embodiment, The combination of the host device 20 and the plurality of terminal devices 10 has such a tree structure that the host device 20 is a root, and the respective terminal devices 10 are nodes other than the root. Each of the terminal devices 10 is connected to the communication line after a terminal ID which is one parent device (hereinafter to as "host device") and a terminal ID of the host server 20 when the host device is not the host server 20 are set. It should be noted that the terminal ID means an address which is set within data (refer to FIG. 2) used when transferring electronic money between the terminal devices to each other or between the host server and the terminal device. Also, the terminal system according to this embodiment is designed such that the data is delivered through the CSMA/CD system.

The tree structure applicable when structuring the terminal system is not limited in the shape, and limited by the tree structural shape (the terminal ID set in the respective terminal devices) taking the number of terminal devices in use, the located place and so on into consideration. The terminal system shown in FIG. 1 is designed in such a manner that, because the relatively small number of terminal devices 10 are located at a plurality of floors, respectively, the terminal ID of the host server 20 is set as the terminal ID of the host device to a terminal device 10-Ia which is located at an I-floor (I=1 to 3), and the terminal ID of the terminal device 10-Ia is set as the terminal ID of the host device to terminal devices 10-Ib to 10-Ie, respectively. It should be noted that as was already described, the terminal ID of the host server 20 is also set to the terminal devices 10-Ib to 10-Ie where the host device is not the host server.

Also, a time at which a shutting process is to be executed is set at the respective terminal devices 10. The shutting process is a process for collecting all the electronic money held by the respective terminal devices 10 to the host server 20, and when the time at which the shutting process is to be executed comes (or the execution of the shutting process is instructed), the operation of the respective terminal devices 10 stops after all the electronic money held by the terminal devices 10 per se is transferred to the host device (the terminal device or the host server) (the details will be described later).

Figure 3:
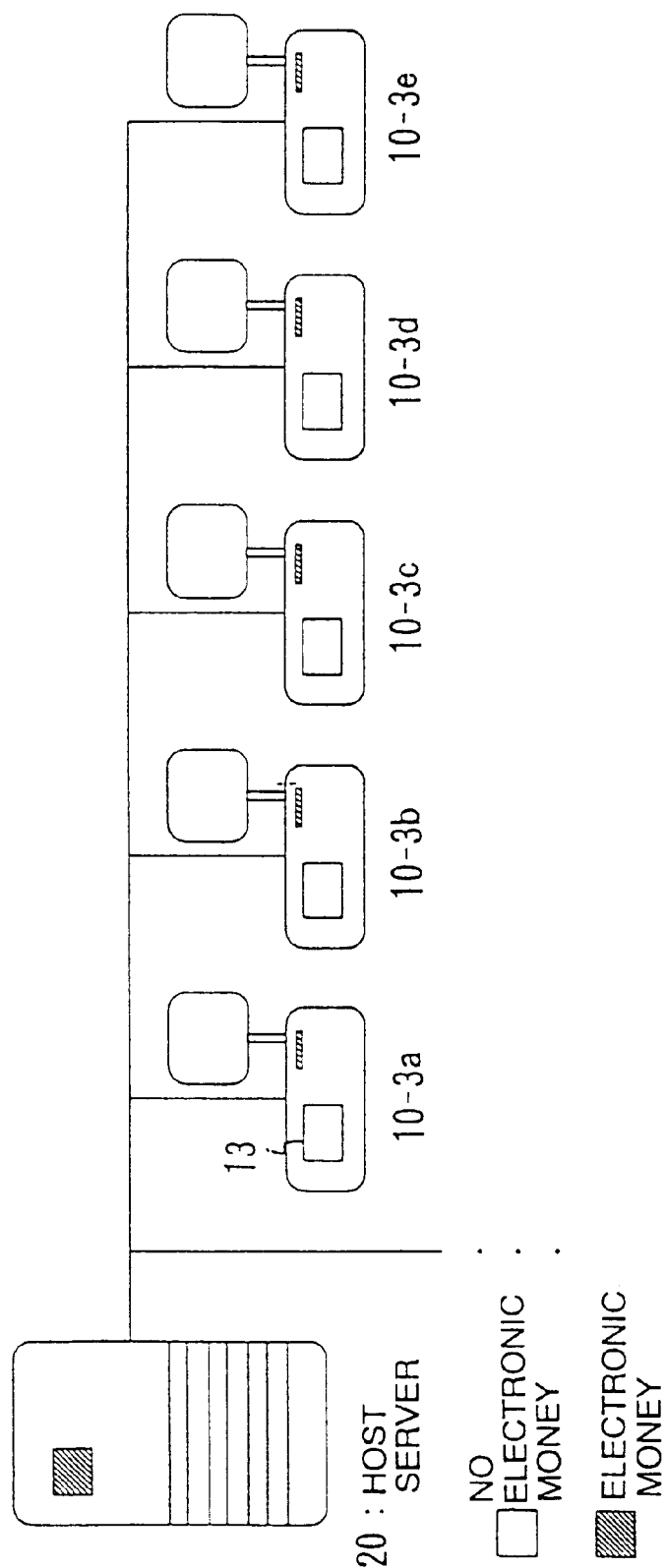
FIG. 3 is an explanatory diagram showing a state of the terminal system according to the embodiment of the present invention before a store is opened.

When the system stops, because the shutting process is executed in the respective terminal devices, the terminal systems are in a state where the balance of the electronic money of the built-in IC card 13 of the respective terminal devices 10 is 0, and the electronic money is stored within only the IC card 21 in the host server 20 before the store opens (before the respective terminals runs), as schematically shown in FIG. 3. Then, a power is supplied to the terminal system from the host device side as a rule. In other words, after a power is supplied to the host server 20, the terminal devices 10-Ib to 10-Ie are started at the I-floor (I=1 to 3) after the terminal device 10-Ia starts.

Figure 4:
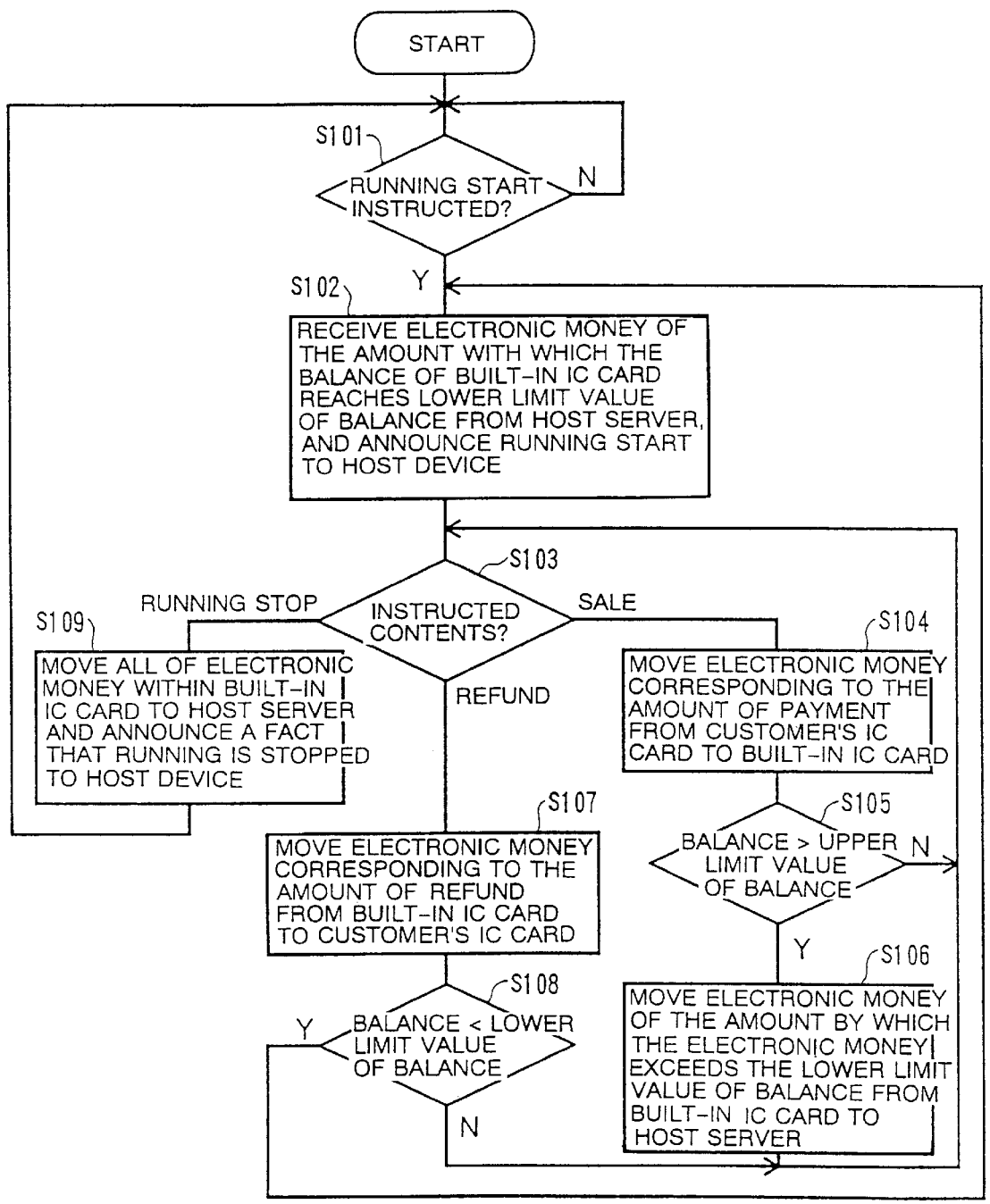
FIG. 4 is a flowchart showing the procedure of operation of the terminal device that constitutes the terminal device according to the embodiment of the present invention.

Hereinafter, the operational procedure of the terminal devices 10 after a power is supplied to the terminal devices will be described in detail with reference to FIG. 4.

As shown in the figure, after being turned on, each of the terminal device 10 becomes in a state where it waits for input of an instruction for a running start (Step 101). The terminal device 10 operates assuming that the running start is instructed when detecting that an identification card (magnetic card) of an operator (register's attendant) is inserted in a magnetic card reader.

When the running start is instructed (Step S101; Y), the terminal device 10 executes a process for receiving from the host server 20 the electronic money of the amount necessary to set the balance of electronic money of the built-in IC card 13 to a predetermined lower limit value of the balance of electronic money, and also announces that the running starts to the host device (Step S102).

As described above, because the balance of electronic money of the built-in IC card immediately after the power is supplied to the terminal device 10 is 0, the terminal device 10 first requests the transfer of electronic money as much as the lower limit value of the balance of electronic money to the host server 20 when executing that step immediately after the running start is instructed. Thereafter, the terminal device 10 stores in the built-in IC card 13 the electronic money which is transmitted by the host server 20 in response to that request, and announces that the running starts to the host device (the host device or the terminal device).

Also, although being omitted in the figure, in Step S102, in the case where the running start could not be announced to the host device (in the case where the host device did not operate), the terminal device 10 announces the running start to the host server 20. Then, the terminal device 10 thereafter operates assuming that the host server 20 is set as the host device. Also, in Step S102, in the case where the host server 20 did not operate, the terminal device 10 displays this fact and waits for the running start of the host server 20.

On the other hand, the host device that receives an announce outputted by a certain terminal device 10 in Step S102 produces information representing that the terminal device 10 is running (hereinafter referred to as "running terminal device information"), and stores the information inside thereof. In other words, the terminal device 10 and the host server 20 have a function of, in the case where they are announced the running start from another device (a terminal device) to, produces the running terminal device information relating to that terminal device to store the information as produced inside thereof.

Figure 5:
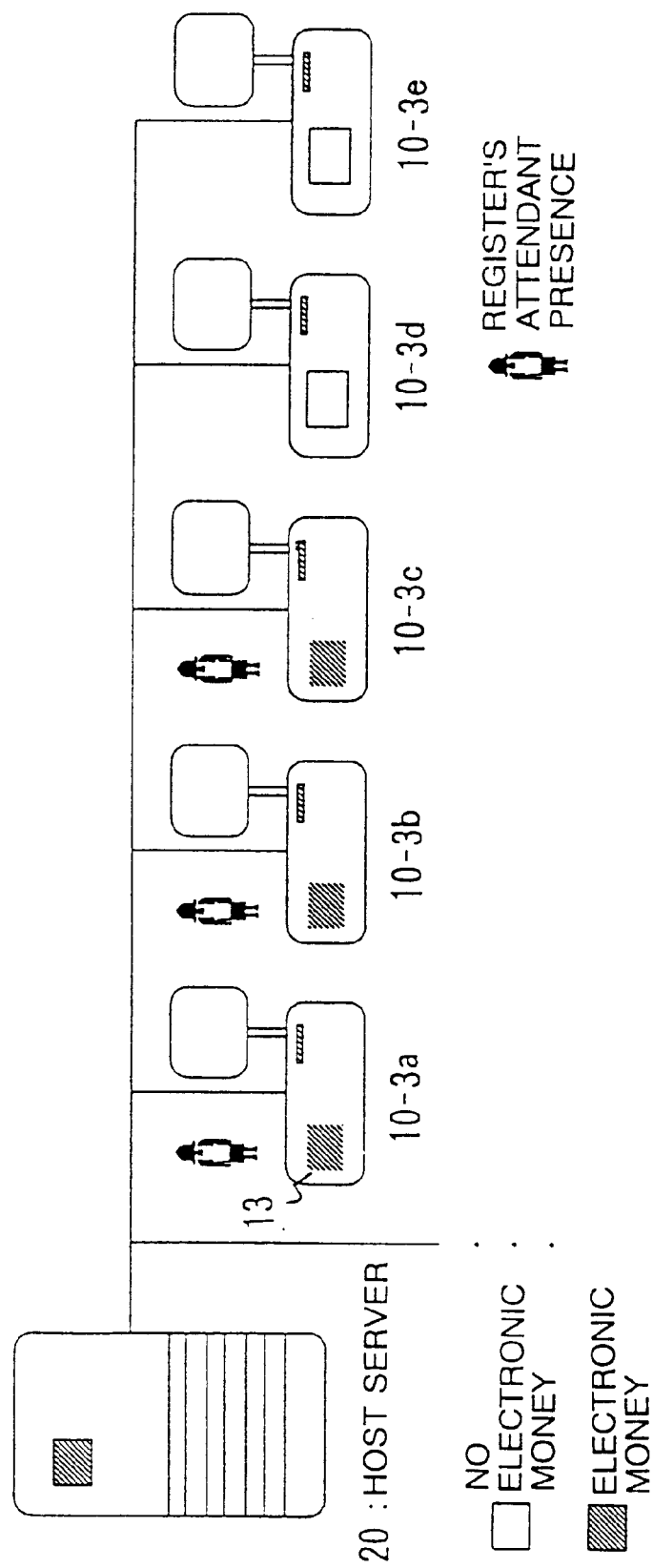
FIG. 5 is an explanatory diagram showing as one example a state of the terminal system according to the embodiment of the present invention after a store is opened.

For example, in the case where a running instruction is inputted to the terminal devices 10-3a, 10-3b, and 10-3c in the stated order from a state shown in FIG. 3, the terminal devices 10-3a through 10-3b receive a predetermined amount of electronic money from the host server 20. As a result, a state of the terminal system is changed as schematically shown in FIG. 5. The terminal device 10-3a announces a fact that running started to the host server 20 which is set as the host device, whereas the terminal devices 10-3b through 10-3c announce a fact that running started to the terminal device 10-3b which is set as the host device. In other words, in the case where the terminal devices 10-3a and 10-3b become in the running state in the above procedure, the host server 20 latches the running terminal device information representing that the terminal device 10-3a is in the running state, and the terminal device 10-3a latches the running terminal device information representing that the terminal device 3b is in the running state, and the running terminal device information representing that the terminal device 3c is in the running state. It should be noted that the running terminal device information is used to confirm whether an offspring terminal device has a running terminal (a terminal that latches electronic money), or not (the details will be described later).

After the execution of Step S102 (FIG. 4), that is, after the terminal device 10 comes to the running state, the terminal device 10 starts to monitor the contents instructed by the operator (Step S103). In this step, the instructions inputted by the operator are roughly classified into a sale process execution instruction, a refund process execution instruction, and a running stop instruction, and in the case where the respective instructions are inputted, the terminal device 10 operates as stated below.

Figure 6:
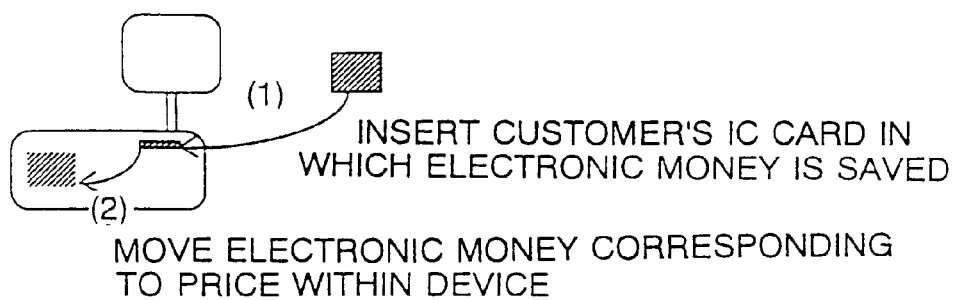
FIG. 6 is an explanatory diagram showing the money receiving operation of the terminal device that constitutes the terminal system according to the embodiment of the present invention.

In the case where the sale process execution is instructed (Step S103; sale), the terminal device 10 conducts a process for moving the electronic money as much as the amount of payment from the customer's IC card storing electronic money therein to the built-in IC card 13 (Step S104). In other words, as schematically shown in FIG. 6, the customer's IC card in which the electronic money is stored is inserted into the IC card reader/writer 11, and in the case where an amount of money of a bought goods or the like was inputted, the terminal device 10 conducts a process for moving the electronic money corresponding to that amount of money from the customer's IC card to the built-in IC card.

Subsequently, the terminal device 10 judges whether the balance of electronic money within the built-in IC card 13 exceeds a predetermined upper limit value of the balance of electronic money (>a lower limit value of the balance of electronic money), or not (FIG. 4; Step S105).

In the case where the balance of electronic money exceeds the upper limit value of the balance (Step S105; Y), a process for moving, to the host server 20, electronic money of the amount by which the electronic money exceeds the upper limit value of the balance, of the electronic money saved in the built-in IC card 13 is executed (Step S106). Thereafter, the terminal device 10 returns its operation to Step S103, and again waits for some instruction being inputted by the operator. On the other hand, in the case where the balance of electronic money does not exceed the upper limit value of the balance (Step S105; N), the terminal device 10 returns its operation to Step S103 without conducting any process on the electronic money within the built-in IC card.

In the case where the execution of the refund process is instructed (Step S103; refund), the terminal device 10 conducts a process for moving the electronic money of the amount as much as the amount of refund from the built-in IC card 13 to the customer's IC card (Step S107). Subsequently, judges whether the balance of electronic money within the built-in IC card is less than the lower limit value of the balance of electronic money, or not (Step S108). Then, in the case where the balance of electronic money within the built-in IC card is less than the lower limit value of the balance of electronic money (Step S108; Y), the operation returns to Step S102 where a process for receiving a shortage of electronic money from the host server 20 is executed. In other words, the terminal device 20 requests the supply of the electronic money of the amount of ("the lower limit value of the balance of electronic money"—"the balance of electronic money") to the host server 20, and saves in the built-in IC card 13 the electronic money which is transmitted by the host server in response to that request in such a manner that the balance of electronic money within the built-in IC card 13 reaches the lower limit value of the balance of electronic money. On the other hand, in the case where the balance of electronic money within the built-in IC card is not less than the lower limit value of the balance of electronic money (Step S108; N), the terminal device 10 returns its operation to Step S103 without conducting any process on the electronic money within the built-in IC card 13, and then waits for some instruction being made by the operator.

In other words, in the case where the execution of sale or refund is instructed, the terminal device 10 judges whether the balance of electronic money after being subjected to the execution of the process is a value between the lower limit value of the balance of electronic money and the upper limit value thereof, or not. In the case where the balance of electronic money after being subjected to the execution of the process is not the value between the lower limit value of the balance of electronic money and the upper limit value thereof, the terminal device 10 delivers the electronic money with respect to the host server 20 in such a manner that the balance of electronic money reaches the lower limit vale of the balance of electronic money.

In the case where running stop is instructed (Step S109; running stop), the terminal device 10 executes a process for moving all the electronic money within the built-in IC card 13 to the host server 20, and also announces a fact that running is stopped to the host device to which the fact that running started has been announced (Step S109). In other words, the terminal device 10 sets the balance of electronic money within the built-in IC card to 0, and also announces the fact that running is stopped to the terminal device 10 or the host server 20 which was originally set as the host device, or the host server 20 which is dealt with as a host device because the host device as set does not operate. It should be noted that the operator instructs the stop of running to the terminal device 10 in the case where he is going to be away from the terminal device 10, in the case where he knows a danger such as a robbery, or the like.

On the other hand, the host device to which the stop of running was announced erases the running terminal device information relating to the terminal device 10 that has outputted the above announce, which is latched inside thereof. In other words, both of the terminal device 10 and the host server 20 also have a function of erasing the running terminal device information relating to the terminal device, which is stored inside thereof, when they are announced the stop of running to from another device (another terminal device).

After the execution of Step S109, the terminal device 10 returns its operation to Step S111, and again waits for the instruction of the start of running.

Figure 7:
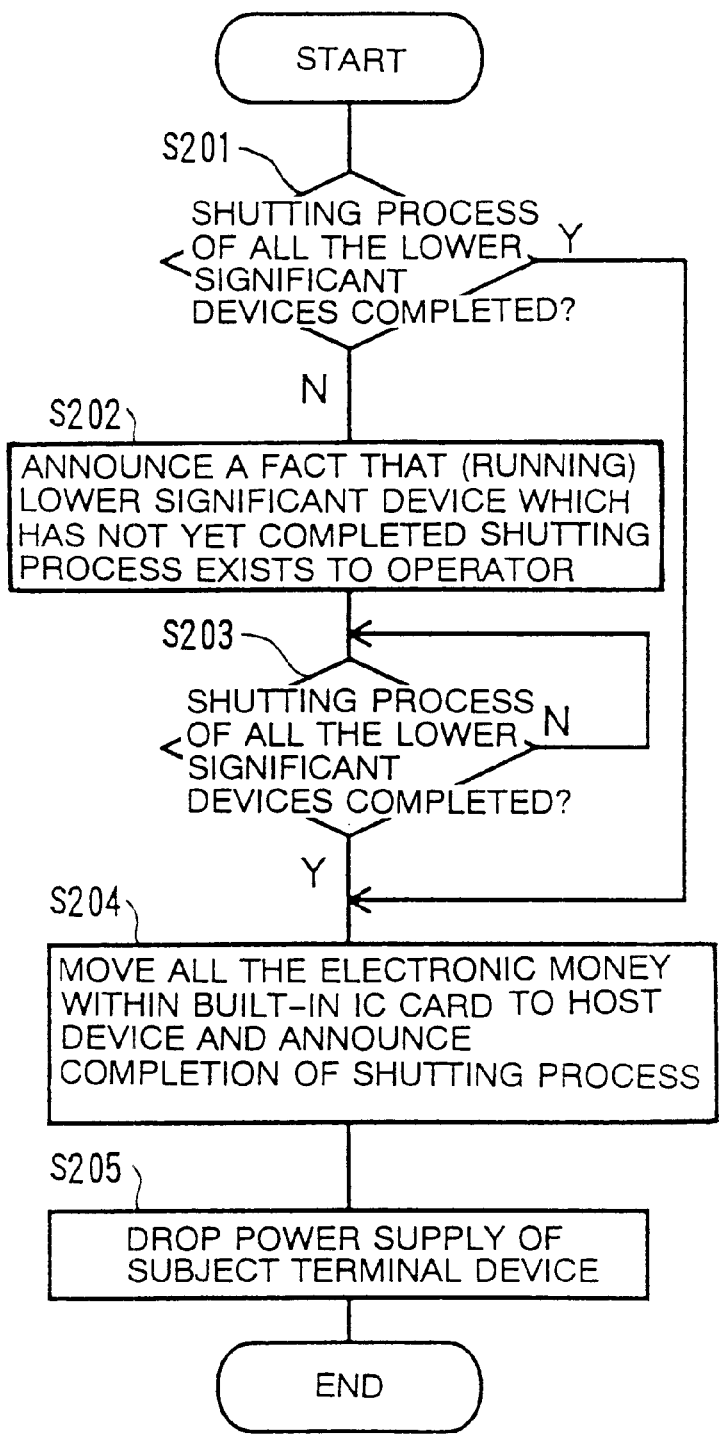
FIG. 7 is a flowchart showing the procedure of operation of the terminal device that constitutes the terminal system according to the embodiment of the present invention when a condition of starting a shutting process is satisfied.

Then, a description will be given of the operation of the terminal device 10 when conducting the shutting process which is conducted after the store is closed with reference to FIG. 7. A flow shown in the figure is started when a time set inside of the terminal device 10 comes as a time at which the shutting process should be executed, and when operation of dropping a power supply is performed (hereinafter referred to as "when a condition for starting the shutting process is satisfied").

When the condition for starting the shutting process is satisfied, the terminal device 10 judges whether the shutting process of all the lower significant devices is completed, or not (Step S201). More specifically, in this step, the terminal device 10 judges that the shutting process of all the lower significant devices is not completed when the running terminal device information has been stored inside of the terminal device 10, but judges that the shutting process of all the lower significant devices is completed when the running terminal device information has not been stored inside of the terminal device 10.

In the case where the shutting process of all the lower devices has not been completed (Step S201; N), the terminal device 10 announces a fact that the shutting process is not completed, that is, the running lower significant device exists to the operator (Step S202). Subsequently, the terminal device 10 waits for the running lower significant device to announce the completion of the shutting process to the terminal device 10 (Step S203). In this step, the subject terminal device 20, when being requested the reception of the electronic money from another terminal device 10, responds to that request. Also, in the case where the terminal device 10 is announced the completion of the shutting process to, the terminal device 10 erases the running terminal device information relating to the terminal device 10 giving the announce from the inside thereof.

Then, the terminal device 10 judges that the shutting process of all the lower significant devices is completed when detecting that the running terminal device information does not exists inside thereof (Step S203; Y), transfers all the electronic money within the built-in IC card 13 to the host device, announces the completion of the shutting process to the host device (Step S204), and then drops the power supply of the subject terminal device (Step S205). Also, in the case where the shutting process of all the lower significant devices has been completed (Step S201; Y) when the condition of starting the shutting process is satisfied, the terminal device 10 immediately executes a process from Step S204 onward.

In other words, in the case where the respective terminal devices 10 that constitute the terminal system are allowed to run in the order of the host device side, as already described, the terminal devices 10-Ia (I=1 to 3) are caused to latch the running terminal device information relating to the terminal devices 10-Ib to 10-Ie. As a consequence, when the execution of the shutting process on the terminal device 10-Ia is instructed before the shutting processes in the terminal devices 10-Ib to 10-Ie are completed, the terminal device 10-Ia branches to the "N" side in Step S201, and waits for the completion of the shutting process of all the lower significant terminals in Step S203.

On the other hand, since the terminal devices 10-Ib to 10-Ie having no lower significant devices are not designed to latch the running terminal device information inside thereof, when the execution of the shutting process is instructed, they branch to the "Y" side in Step S201. Then, in Step S204, the terminal devices 10-Ib to 10-Ie transfer all the electronic money within the built-in IC card to the host device, that is, the terminal device 10-3a, and also announce the completion of the shutting process thereto.

As a result, the terminal device 10-3a detects the completion of the shutting processes of all the lower significant terminals when the movement of the electronic money which has been stored within the terminal devices 10-Ib to 10-Ie to their built-in IC cards has been completed. Then, a process of transferring the electronic money within the built-in IC card 13 to the host server 20 starts. In other words, the terminal device 10-Ia, as schematically shown in FIG. 8, transfers, after receiving all the electronic money which has been stored within the respective terminal devices 10 with the terminal device 10-Ia as the host device, those electronic money to the host server 20 together with the electronic money stored within the terminal device 10-Ia per se.

It should be noted that the host server 20 conducts substantially the same operation as that of the terminal device which is described with reference to FIG. 7, except that the host server 20 does not transfer the electronic money latched inside thereof to the host device when operation for stopping the power supply is performed. In other words, when the operation for stopping the power supply is conducted, in the case where the host server 20 does not latch the running terminal device information, the host server 20 immediately responds to that stopping operation, whereas in other cases, the host server 20 confirms that it is announced the completion of the shutting process (or stop of running) to from the terminal device relating to the respective running terminal device information which is held inside thereof before the host server 20 responds to the operation of stopping the power supply, and thereafter drops the power supply of itself.

Finally, in a case in which a running instruction is inputted to the terminal devices 10-3b, 10-3c and 10-3a in the stated order, and a power is not supplied to other terminal devices as an example, the operation of the shutting process by the terminal system when the lower significant device becomes in the running state earlier than the host device will be described.

In this example, the terminal devices 10-3b and 10-3c to which a running instruction has been inputted in a state where the terminal device 10-3a which is set as the host device does not operate announces a fact that running starts to not the terminal device 10-3a which is an original host device but the host server 20. Also, the terminal device 10-3a, when the running instruction is inputted to the terminal device 10-3a, announces the fact that running starts to the host server 20 which is set as the host device. As a result, the host server 20 satisfies the condition of starting the shutting process in a state where it latches the running terminal device information relating to the terminal devices 10-3a to 10-3c, or in a state where none of the terminal devices 10-3a to 10-3c latches the running terminal information.

Therefore, the terminal devices 10-3a to 10-3c responds to that instruction immediately when the condition of starting the shutting process is satisfied. Then, the host server 20 stops its operation after it absorbs all the electronic money within all the terminal devices 10 that constitute the terminal system when operation for dropping the power supply is made. In this way, the terminal system according to this embodiment is designed to accurately operate even when the respective devices are not started in the order corresponding to the three structure.

As described above in detail, according the terminal system of this embodiment, the shutting process (work for collecting the electronic money within the respective terminal devices to the host server) is remarkably simply conducted. In other words, the terminal system according to this embodiment is a system in which a countermeasure against a robbery is sufficiently made by only the host server. Also, during the shutting process, the electronic money within the lower significant terminal device is sequentially collected to the more significant terminal device, and through the terminal device with the host server as a parent device, all the electronic money within its terminal device and an offspring terminal device is transferred to the host server. For that reason, the terminal system according to this embodiment prevents processing from being concentrated in the host server during the shutting process.

Also, according to the terminal system of this embodiment, since the respective terminal devices receive a predetermined amount of electronic money from the host server, the respective terminal device can immediately conduct transaction of goods including refund. Further, since only the electronic money of a predetermined amount (the upper limit value of the valance of electronic money) or less is held within the respective terminal devices, even when the built-in IC card encounters a trouble due to some causes, a loss can be suppressed to the minimum.

(Modified Embodiment)

Figure 9A:
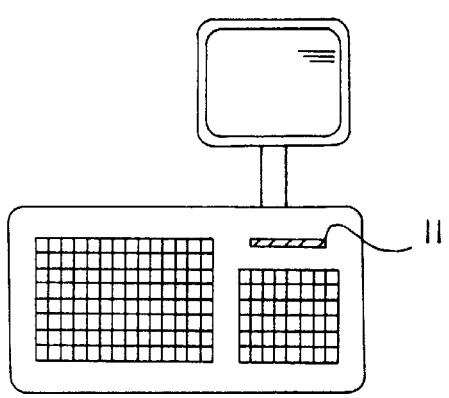
FIGS. 9A and 9B are explanatory diagrams showing an appearance of the terminal device which is applicable to the terminal system according to the embodiment of the present invention.
Figure 9B:
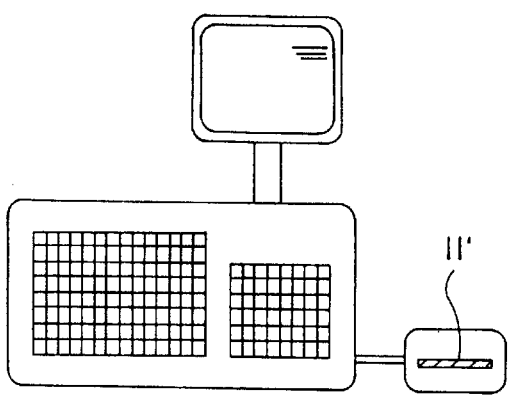

The terminal system according to the above embodiment is variable. For example, although the terminal system according to this embodiment employs the terminals where the IC card reader/writer 11 into which a customer's IC card is inserted is accommodated in a main body as shown in FIG. 9A, a IC card reader/writer 11' into which the customer's IC card is inserted may be provided separately from the main body. Also, the terminal system may be designed in such a manner that the system employs an electronic money storage medium other than the IC card. Further, a communication procedure for transacting the electronic money between the respective terminal devices may be applied with any types of manners, for example, what employs a token or a polling.

Furthermore, the terminal system may be designed in such a manner that the electronic money of the amount as much as the lower limit value of the balance of electronic money is delivered to the respective terminal devices according to the tree structure not only during the shutting process but also at the starting time. More specifically, the host server is provided with a function of, when the host server receives a reset request from a terminal device which is its daughter, transferring to the terminal device the total amount of the electronic money which is to be held when the terminal device and its offspring terminal device are in an initial state. Then, each of the terminal devices is provided with a function of sending the reset request to the terminal device which is its parent device or the host device when it starts, a function of storing in the built-in IC card the electronic money which has been transferred from the parent terminal device or the host device in response to the reset request, and a function of transferring, to the terminal device, the total amount of the electronic money which is to be held when the terminal device and the offspring terminal device are in the initial state, when it receives the reset request from the daughter terminal device. In applying the above structure, the respective terminal devices are designed such that the balance of electronic money except for the electronic money for other terminal devices is compared with the lower limit value of the balance of electronic money or the higher limit value thereof.

Furthermore, the above technique is applicable even to the transacting system in a financial institution such as a bank. In this case, the terminal device corresponds to the automatic teller's machine (ATM), and the host server corresponds to the host computer.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A terminal device which is connected to a host device that functions as a money safe of electronic money in use, comprising:

electronic money storage means for storing the electronic money;

first moving means for moving the electronic money corresponding to an amount transferred by transaction with a customer from an electronic money storage medium of the customer to said electronic money storage means; and first balance adjusting means for moving the electronic money as much as an amount by which the electronic money exceeds a lower limit value which is a value lower than a predetermined upper limit value within said electronic money storage means to said host device when the balance of the electronic money within said electronic money storage means exceeds said predetermined upper limit value.

2. A terminal device which is connected to a host device that functions as a money safe of electronic money in use, comprising:

electronic money storage means for storing electronic money;

first moving means for moving the electronic money corresponding to an amount which is transferred by transaction with a customer from an electronic money storage medium of the customer to said electronic money storage means; and second moving means for moving all the electronic money within said electronic money storage means to said host device when a predetermined time comes.

3. A terminal device as claimed in claim 2, further comprising first balance adjusting means for moving the electronic money as much as an amount by which the electronic money exceeds a lower limit value which is a value lower than a predetermined upper limit value within said electronic money storage means to said host device when a balance of the electronic money within said electronic money storage means exceeds said predetermined upper limit value.

4. A terminal device as claimed in claim 3, further comprising:

third moving means for moving the electronic money corresponding to an amount which is transferred by transaction with the customer from said electronic money storage means to the electronic money storage medium of the customer; and second balance adjusting means for moving the electronic money from said host device to said electronic money storage means so that the balance of the electronic money within said electronic money storage means reaches said lower limit value when the balance of the electronic money within said electronic money storage means is lower than said lower limit value.

5. A terminal device as claimed in claim 4, further comprising:

fourth moving means for moving all the electronic money within said electronic money storage means to said host device when a predetermined instruction is inputted to said terminal device.

6. A terminal system including a host device that functions as a money safe of electronic money and a plurality of terminal devices, wherein said host device and said plurality of terminal devices have a tree structure that said host device is a root, and said respective terminal devices are nodes other than the root, each of said plurality of terminal devices comprising:

electronic money storage means for storing the electronic money;

first moving means for moving the electronic money corresponding to an amount which is transferred by transaction with a customer from an electronic money storage medium of the customer to said electronic money storage means; and second moving means for moving, after confirming that the balance of electronic money in said electronic money storage means in all the terminal devices which are daughters of a subject terminal device is zero at the time of conducting a shutting process, all the electronic money within said electronic money storage means to the terminal device which is a parent of the subject terminal device or said host device.

7. A terminal system including a host device that functions as a money safe of electronic money and a plurality of terminal devices, wherein said host device and said plurality of terminal devices have a tree structure that said host device is a root, and said respective terminal devices are nodes other than the root, said host device comprising:

transfer means for transferring to a subject terminal device the total amount of the electronic money to be held in a state where the subject terminal device and the offspring terminal devices of the subject terminal device are in an initial state, when receiving a reset request from the terminal device which is a daughter of the subject terminal device; and each of said plurality of terminal devices comprising:
electronic money storage means for storing the electronic money;
exchange means for exchanging the electronic money corresponding to the amount which is transferred by transaction with the customer between an electronic money storage medium of the customer and said electronic money storage means;
a reset request sending means for sending a reset request to the terminal device which is a parent of the subject terminal device or said host device when the subject terminal device is started;
electronic money receiving means for storing the electronic money which has been transferred from said terminal device which is a parent of the subject terminal device or said host device in said electronic money storage means in response to the reset request from said reset request sending means; and
inter-terminal electronic money transfer means for transferring to the subject terminal device the total amount of the electronic money to be held in the state where the subject terminal device and the offspring terminal device of the subject terminal device are in the initial state, when the subject terminal device receives the reset request from said terminal device which is a daughter of the subject terminal device.

8. A terminal system as claimed in claim 7, wherein each of said plurality of terminal devices further comprising: second moving means for moving to the terminal device which is a parent of the subject terminal device or said host device all the electronic money within said electronic money storage means after confirming that the balance of said respective electronic money storage means in all said terminal devices which are daughters of the subject terminal device is 0 at the time of conducting an operation which means an execution of a shutting process.

9. A terminal device comprising:
first transferring means for transferring electronic money corresponding to an amount by transactions from an electronic money storage medium being detachably attached to electronic money storage means; and
second transferring means for the electronic money in the electronic money storage means to a money safe when a predetermined time comes.

10. A terminal device to be connected to a host device including an electronic money safe, said terminal device comprising:
an electronic money storage means in which electronic money is stored; and
request means for requesting the host device to transfer electronic money from the electronic money safe to the electronic money storage means when the terminal device is started.

11. A terminal device to be connected to a host device including an electronic money safe, said terminal device comprising:
electronic money storage means for storing electronic money; and
transfer means for transferring a total amount of the electronic money stored in the electronic money storage means to the electronic money safe in the host device when the terminal device is stopped.

12. A terminal device to be connected to a host device including an electronic money safe, said terminal device comprising:
electronic money storage means for storing electronic money set thereto;
referring means for referring to a balance of the electronic money stored in the electronic money storage means; and
transfer means for transferring the electronic money stored in the electronic money storage means to the electronic money safe of the host device when the balance of the electronic money exceeds a predetermined upper limit value.

13. A terminal device to be connected to a host device including an electronic money safe, said terminal device comprising:
electronic money storage means for storing electronic money set thereto;
referring means for referring to a balance of the electronic money stored in the electronic money storage means; and
transfer means for transferring the electronic money stored in the electronic money safe of the host device to the electronic money storage means when the balance of the electronic money falls below a predetermined lower limit value.

14. An electronic money system comprising:
a host device; and
a terminal device having an electronic money storage means for storing electronic money;
wherein the terminal device requests the host device to transfer an amount of electronic money corresponding to a predetermined lower limit value from the host device to the terminal device, and
the host device transfers the amount of electronic money in accordance with the request from the terminal device.

15. A terminal system comprising a host device and a plurality of terminal devices connected to the host device, the terminal device comprising:
first transferring means for transferring electronic money corresponding to an amount transferred by transactions with a customer from an electronic money storage medium of the customer to electronic money storage means storing the electronic money; and
second transferring means for transferring the electronic money in the electronic money storage means equipped in a subject terminal device to the host device after confirming that a balance of electronic money in the electronic money storage means equipped in all terminal devices which are daughters of the subject terminal device is zero at a time of conducting a shutting process.

16. A terminal system comprising a host device and a plurality of terminal devices connected to the host device, the host device comprising:

transfer means for transferring to a subject terminal device a total amount of electronic money to be held in a state where the terminal devices are in an initial state when receiving a reset request from the terminal device connected to the host device; and each terminal device comprising:

reset request sending means for sending a reset request to the host device when the subject terminal device is started; and electronic money receiving means for storing the electronic money, which has been transferred from the host device, into electronic money storage means storing the electronic money in response to the reset request from the reset request sending means.

17. A terminal system according to claim 16, wherein each terminal device comprises inter-terminal electronic money transfer means for transferring to a subject terminal device the total amount of electronic money to be held in a state where the subject terminal device is in an initial state when receiving a reset request from the terminal device connected to the subject terminal device.

18. A terminal device in which a temporary electronic money memory storing electronic money data is set thereto, comprising:

determining means for determining a value of electronic money data stored in the temporary electronic money memory; and transfer means for transferring the electronic money data from the temporary electronic money memory to an electronic money safe when the value of the electronic money data exceeds a predetermined limit value.

19. A terminal device in which a temporary electronic money memory storing electronic money data is set thereto, comprising:

determining means for determining a value of electronic money data stored in the temporary electronic money memory; and output means for outputting a request to transfer the electronic money data from an electronic money safe to the temporary electronic money memory when the value of the electronic money data stored in the temporary electronic money falls below a predetermined lower limit value.

20. A money safe system comprising:

a terminal device having a temporary electronic money memory; and an electronic money safe;

wherein the terminal device transfers electronic money data from an electronic money storage medium to the temporary electronic money memory, and transfers the electronic money data from the temporary electronic money memory to the electronic money safe when a value of the electronic money data stored in the temporary electronic money memory exceeds a predetermined limit value.

21. A money safe system comprising:

a terminal device having an temporary electronic money memory; and an electronic money safe to be connected to the terminal device;

wherein the terminal device transfers electronic money data from the temporary electronic money memory to the electronic money safe when a value of the electronic money data stored in the temporary electronic money memory exceeds a predetermined limit value.

22. A money safe system comprising:

a terminal device having a temporary electronic money memory; and an electronic money safe to be connected to the terminal device;

wherein the terminal device transfers electronic money data from the electronic money safe to the temporary electronic money memory when a value of the electronic money data stored in the temporary electronic money memory falls below a predetermined lower limit value.

* * * * *